United States Patent

Matweecha

[15] 3,648,985
[45] Mar. 14, 1972

[54] BLENDING APPARATUS

[72] Inventor: David M. Matweecha, Bethlehem, Pa.
[73] Assignee: Fuller Company
[22] Filed: Dec. 1, 1970
[21] Appl. No.: 94,137

[52] U.S. Cl. ..........................................259/4, 259/DIG. 17
[51] Int. Cl. ..................................................B01f 13/02
[58] Field of Search ..........................259/4, DIG. 17, 18, 36

[56] References Cited

UNITED STATES PATENTS

| | | | |
|---|---|---|---|
| 2,244,195 | 6/1941 | Hasselbach | 259/DIG. 17 |
| 2,723,838 | 11/1955 | Peters | 259/4 |
| 3,276,753 | 10/1966 | Solt | 259/4 |
| 3,388,894 | 6/1968 | Harrison | 259/4 |
| 3,490,655 | 1/1970 | Ledgett | 259/4 |

FOREIGN PATENTS OR APPLICATIONS

| | | | |
|---|---|---|---|
| 539,141 | 11/1931 | Germany | 259/DIG. 17 |

*Primary Examiner*—Robert W. Jenkins
*Attorney*—Jack L. Prather and Frank H. Thomson

[57] ABSTRACT

A blending apparatus for mixing dry pulverulent materials which includes a vessel having a gas permeable divider means mounted therein dividing the vessel into a material chamber and a plenum chamber. The vessel includes a material inlet and material outlet. A hollow, open-ended blending column is mounted in the material chamber. Gas under pressure is supplied to the plenum chamber and passes through the gas permeable divider to aerate material in the material chamber. Gas at an increased velocity is supplied to the bottom of the column to circulate material in the material chamber upwardly through the column to thereby blend the material. The column is tapered so that material flowing through that column continuously increases in velocity.

10 Claims, 2 Drawing Figures

INVENTOR
DAVID M. MATWEECHA

BY Frank H. Thomson
Jack L. Prother
ATTORNEY 3,648,985

BLENDING APPARATUS

BACKGROUND OF THE INVENTION

This invention relates to bulk material blending apparatus for mixing and blending dry pulverulent material. More particularly, the invention relates to an improved air lift blending apparatus.

In many processes, such as the manufacture of Portland cement, it is necessary to blend together diverse pulverulent materials such as the various materials which make up the raw mix used in the manufacture of Portland cement. The present invention is concerned with apparatus for blending of pulverulent materials.

Prior to the present invention, various types of pulverulent material blenders employing gaseous fluid at elevated pressures were known. Early blenders supplied gaseous fluid through an air permeable silo bottom at varying rates to thereby blend the material. Improved blending apparatus is shown in U.S. Pat. Nos. 2,844,361 and 3,003,752 wherein the gas permeable silo bottom is divided into sections. Gas under pressure is supplied to each of the sections to aerate the material. Gas at elevated volume and pressure is supplied to one of the sections to fluidize the material above that section so that it spills over onto the material above the other section. Material in those other sections flows into the fluidized section. Pulses of gas may be supplied to the fluidized section to achieve better blending. Valving may be provided to alter the section which is supplied with fluidizing gas.

A second type of pulverulent material blender is disclosed in U.S. Pat. application Ser. No. 22,640, filed Mar. 25, 1970 and assigned to the assignee of the present invention. In such application, a blender is disclosed which includes a vessel having a gas permeable bottom. An air lift column is mounted within the blending vessel. Material in the vessel is aerated by supplying gas under pressure through the permeable bottom. Gas under pressure is directed into the blending column at a velocity higher than the gas used to aerate the material so that material flows upwardly through the column and is circulated within the vessel.

The present invention relates to an improvement over the blending apparatus disclosed in the above mentioned U.S. Pat. application.

SUMMARY

It is the principal object of this invention to provide an apparatus for blending pulverulent materials which is capable of increasing the rate at which such materials may be blended.

It is an additional object of this invention to provide an air lift type of blending apparatus which achieves a more thorough blending of the pulverulent material in a shorter period of time.

In general, the foregoing and other objects of this invention will be carried out by providing in a blending system for blending pulverulent material including an upright vessel with a material inlet port and a material outlet port, a gas permeable divider means positioned in the vessel dividing the vessel into a material chamber and a lower plenum chamber, at least one hollow, open-ended blending column positioned in said vessel and extending upward from said divider means, said blending column being spaced from said divider means to provide a material inlet opening into said blending column, means for supplying fluidizing gas to said material chamber through said divider means, and means for supplying blending gas into the bottom of the blending column at a velocity higher than the fluidizing gas, the improvement comprising the sidewalls of said blending column being tapered upwardly and inwardly from the end near said divider means substantially completely to the other end.

BRIEF DESCRIPTION OF THE DRAWING

The invention will be described in connection with the annexed drawing wherein.

BRIEF DESCRIPTION OF THE PREFERRED EMBODIMENTS

Figure 1:
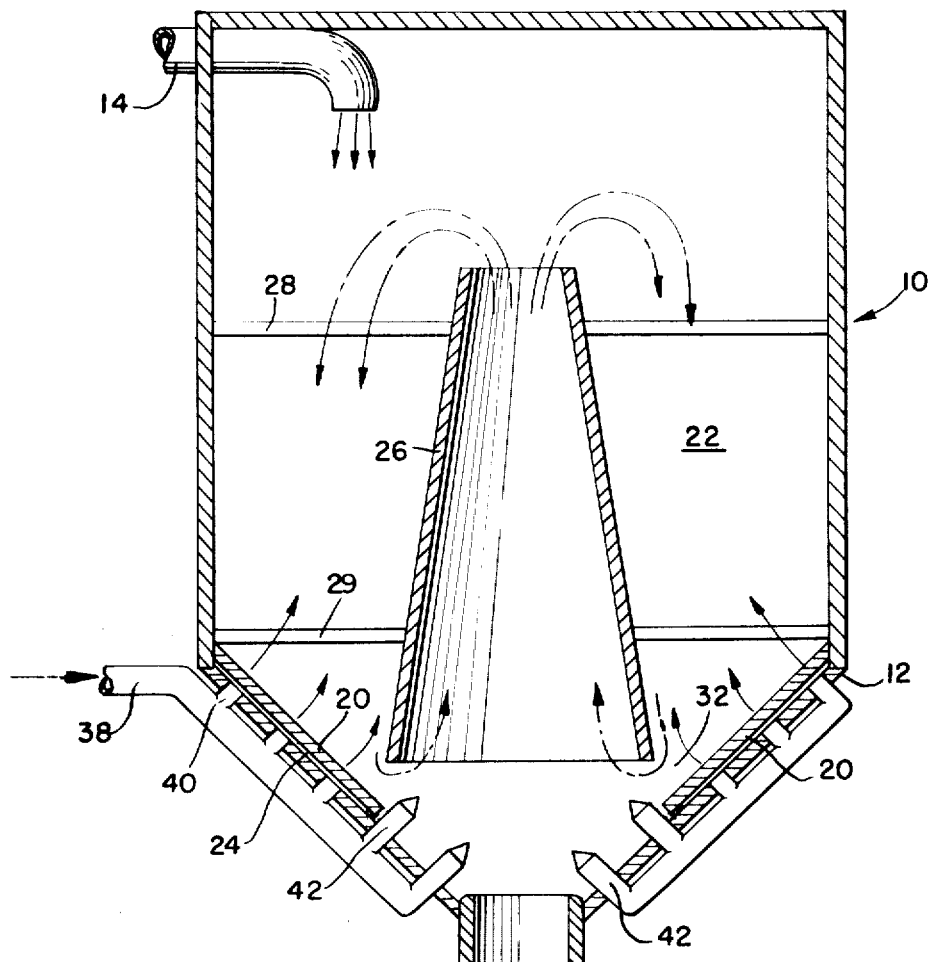
FIG. 1 is a section view of the blending apparatus of the present invention.

Referring to FIG. 1 of the drawing, the blending apparatus of the present invention includes a vessel generally indicated at 10. The vessel is provided with a conical bottom 12 and a material inlet 14 and material outlet 16. A valve 18 may be provided in the outlet 16 for controlling the discharge of material from the vessel. A gas permeable divider means 20 is mounted in the vessel 10 near the conical bottom 12 and spaced from such bottom 12 to divide the vessel 10 into an upper material chamber 22 and a lower plenum chamber 24.

A blending column 26 is mounted within the material chamber 22 by means of suitable bracing 28 and 29. The column 26 is mounted in the material chamber 22 so that it is spaced from the divider means 20. This spacing defines an annular material inlet 32 for the column 26.

The column 26 is an open-ended tapered column having sidewalls which slope upwardly and inwardly from its base toward its top. The column preferably takes the shape of a frustum of a right circular cone.

Gaseous fluid under pressure is supplied from a source (not shown) through a conduit 38 and suitable piping 40 to the lower plenum chamber 24. The gas flows through the porous divider means 20 into the material chamber 22 to aerate the material in that chamber. In the material blender shown in FIG. 1, gaseous fluid under pressure is also supplied, as through a conduit 42, directly into the bottom of the column 26. This gas is at a higher velocity than the gas used to aerate the material in the chamber 22. This gas may come from the same source as that supplied to the plenum 20 or some other suitable source. A single source of gas under pressure may be used because the gas supplied to the plenum 24 must pass through the gas permeable divider 20 and that supplied to the column 26 does not pass through this divider. Thus, the velocity of air supplied directly to the column will be higher than that supplied to the rest of the chamber 22.

Figure 2:
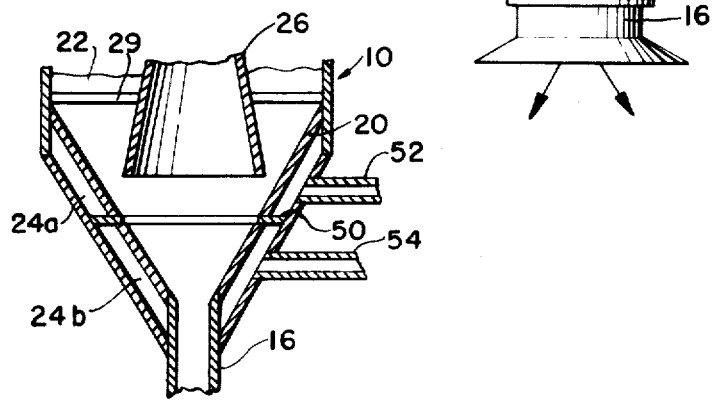
FIG. 2 is a fragmentary sectional view of a modified blender employing the present invention.

In the material blender shown in FIG. 2, the gas permeable divider means 20 is separated into two plenum chambers 24a and 24b by means of an annular ring member 50. Gaseous fluid under pressure is supplied to plenum chamber 24a by means of a conduit 52 from a suitable source (not shown). Such gaseous fluid passes through the divider means 20 and aerates the material in the chamber 22. Gaseous fluid under pressure is supplied to plenum chamber 24b at a velocity higher than the gas supplied to plenum 24a by means of conduit 54 from a suitable source (not shown). Such gaseous fluid passes through divider means 20 at a velocity higher than that passing through divider 20 from chamber 24a and is directed to the bottom of the blending column 26.

If desired, a blender employing a combination of the aeration systems of FIGS. 1 and 2 may be used. For example, in FIG. 2, a second source of blending column gas may be directed through the outlet 16 directly to the blending column 26 without passing through the divider means 20. The important feature is that the gaseous fluid supplied to the bottom of the blending column be at a higher velocity than the gaseous fluid used for aerating the material in chamber 22.

As in the case of the apparatus disclosed in U.S. Pat. application Ser. No. 22,640, filed Mar. 25, 1970, the higher velocity gas supplied to column 26 will cause the material in the column 26 to flow upwardly through the column 26 and out its upper end. Material outside of the column will be drawn into the column resulting in a circulation of material within the vessel. Although the straight column shown in the above mentioned U.S. Pat. application does a good job of blending pulverulent materials, it is believed that by employing a tapered column as shown in the drawing of the present application a faster rate of blending and a more thorough blending in a given period of time may be accomplished.

By employing a tapered column, the velocity of material flowing through the column 26 substantially continuously increases as measured from the bottom of the blending column to the top of the blending column. The increase in velocity has beneficial results in that the material which exits from the top of the column is believed to flow farther out from the sides of the column towards the edge of the vessel 10 to thereby achieve a more thorough mixing of the material in the blender. The material exiting from the upper end of the column will cover substantially the full area of material chamber 22. Employing a straight column, it is believed that material exiting from the column will remain close to the sides of the column. By employing a column with continuously increasing velocity, more material will pass through the column thereby increasing the amount of material circulated throughout the blender in a given period of time. This decreases the amount of time acquired to achieve a desired blend. Thus, the increasing velocity provided by the tapered column provides faster blending and more thorough blending in a given period of time because larger amounts of material will be circulated within such given period of time.

It is believed that the advantages of the tapered blending column will be realized if the cross-sectional area of the bottom of the column 26 is about twice the cross-sectional area of the top of the column so that the velocity of material passing through the bottom of the blending column is about one-half the velocity of the material passing through the top of the blending column. It is believed that this is a good proportion to maintain for proper blending. However, it should be understood that other dimensional differences between the top and bottom of the blending column may be employed and are considered to be within the scope of the present invention.

The angle of taper of the column is determined from the size of the blending vessel 10. The column should be of a height so that when gas is supplied to the plenum 24 and passes through the divider 20 to aerate material in the chamber 22, the material will expand to a height greater than the height of the column 26. In some instances, the height of the column 26 should also be less than the "dead" depth of material in the blender vessel 10. The bottom dimension of the column should be sufficiently large to "capture" the gas supplied from conduits 42 in a manner similar to the bell-shaped column disclosed in U.S. Pat. application Ser. No. 22,640, filed Mar. 25, 1970. The bottom of the column should be small enough to enable the inlet 32 to be large enough to permit adequate flow of material into the column 26.

The particular taper and dimensional differences between the top and bottom of the blending column which is most desirable must be determined through consideration of the material to be blended and the amount of air supplied to the blender as well as the size of the blender.

From the foregoing it should be apparent that the objects of the present invention have been carried out. A blender which is capable of increasing the rate at which material is blended and the assurance of a homogeneous blend of material has been provided.

It is intended that the foregoing be merely a description of a preferred embodiment and that the invention be limited solely by that which is within the scope of the appended claims.

I claim:

1. In a blending system for blending pulverulent material including an upright vessel with a material inlet port and a material outlet port, a gas permeable divider means positioned in the vessel dividing the vessel into a material chamber and a lower plenum chamber, at least one hollow, open-ended blending column positioned in said vessel and extending upward from said divider means, said blending column being spaced from said divider means to provide a material inlet opening into said blending column, means for supplying fluidizing gas to said material chamber through said divider means, and means for supplying blending gas into the bottom of the blending column at a velocity higher than the fluidizing gas, the improvement comprising the sidewalls of said blending column being tapered upwardly and inwardly from the end near said divider means substantially completely to the other end.

2. In the blending system of claim 1, the improvement further defined by said blending column being in the shape of a frustum of a right circular cone.

3. In the blending system of claim 1, the improvement further defined by the sidewalls of said blending column being tapered by an amount such that the internal cross-sectional area of the end of the blending column near said divider means is about twice the internal cross-sectional area of the other end of the blending column.

4. In the blending system of claim 1, the improvement further defined by said blending column being tapered by an amount such that the velocity of material passing through the end of the blending column near the divider means is about one-half the velocity of material passing through the other end of the blending column.

5. Apparatus for blending pulverulent material comprising:
an upright vessel having a material inlet port and a material outlet port;
a gas permeable divider means mounted in said vessel to define an upper material chamber and a lower plenum chamber;
at least one hollow, open-ended blending column mounted within said material chamber and extending generally vertically upwardly from said divider means;
said blending column being spaced from said divider means to define a material inlet opening into the blending column;
means for supplying gaseous fluid under pressure to said plenum chamber for passage through said divider means for aerating material in said material chamber;
means for supplying gaseous fluid under pressure into the bottom of the blending column, at a velocity greater than the gaseous fluid which passes through said divider means for aerating material in said material chamber whereby material flows upwardly through said blending column;
said blending column being dimensioned so that the velocity of material flowing through the blending column substantially continuously increases as measured from the bottom of the blending column to the top of the blending column.

6. The apparatus of claim 5 wherein said blending column is in the shape of a frustum of a right circular cone.

7. The apparatus of claim 5 further comprising means for separating said lower plenum chamber into at least a pair of plenum chambers; said means for supplying gaseous fluid under pressure to said plenum chamber for aerating material in said material chamber being connected to one of said pair of plenum chambers; and said means for supplying gaseous fluid under pressure into the bottom of said blending column being connected to the other of said pair of plenum chambers for passage through said divider means.

8. The apparatus of claim 5 wherein said means for supplying gaseous fluid under pressure into the bottom of said blending column includes means for supplying said gaseous fluid directly to said blending column.

9. The apparatus of claim 5 wherein the sidewalls of said blending column are tapered by an amount such that the velocity of material passing through the bottom of the blending column is about one-half the velocity of material passing through the top of the blending column.

10. The apparatus of claim 5 wherein the sidewalls of said blending column are substantially continuously tapered inwardly from its bottom towards its top by an amount such that the cross-sectional area of its bottom is about twice the cross-sectional area of its top.

* * * * *